Patented June 12, 1945

2,377,853

UNITED STATES PATENT OFFICE 2,377,853

PROTEIN MANUFACTURE

Robert A. Boyer, Dearborn, and Joseph Crupi and William T. Atkinson, Detroit, Mich., assignors to Ford Motor Company, Dearborn, Mich., a corporation of Delaware No Drawing. Application May 10, 1941, Serial No. 392,936

1 Claim. (Cl. 260—112)

The object of our invention is to provide an improvement in protein manufacturing so that a purer, more economical and more usuable product may be obtained.

This invention concerns the processing of proteins to be used in spinning fibers, in water paints, glues, sizes and similar compositions.

We have discovered that if protein precipitates are subjected to a slow-freezing process, they are not only effectively dehydrated, but their physical characteristics are greatly changed and improved. Thus, by substituting the slow-freezing step for the conventional step of dehydrating by draining or filtering under pressure, we find that the requisite degree of dehydration is obtained more economically. We further find that the slow-frozen material may be readily washed, drained, pressed or grated as circumstances may require, while those conventionally dehydrated tend to be soft or mushy and difficult or slow to process.

It is a further object of our invention to produce protein material which, after dehydration, may be stored without further drying and used eventually in that state—a routine most difficult with conventionally dehydrated materials.

Another object is to denature the protein materials by slow-freezing to obtain such changes in the chemical linkages of the protein molecules as may be desired.

In the usual procedure, the first step of protein extraction is to flake suitable oleaginous seed materials such as soy beans. These flaked materials are subjected to mechanical separation or to a solvent extraction to remove the oils or other fatty substances. Protein is extracted from the resulting nearly oil-free material by dissolving it in weak aqueous solutions of alkali, alkali salts or other protein solvents whose pH may range from 7.0 to 12.0. The remaining undissolved protein-containing material suspended in the aqueous solution or effluent is removed by means of settling, filtering, or mechanical separation; and this material may be employed in a subsequent operation or as a by-product. The effluent of the preceding step is precipitated at or near its isolectric point with suitable acids such as lactic, acetic, sulphuric, sulphurous, etc., that point for soy-bean protein being approximately pH 4.2 to 5.2. The precipitated proteins are then thoroughly washed to eliminate undersirable soluble salts and excess acids. After each washing, the protein is allowed to settle and the supernatant liquor removed by decantation.

Physical characteristics of proteins thus precipitated depend largely upon the conditions under which the acid was added to the effluent, particularly the temperature and mechanical agitation. This temperature may vary from 75° to 190° F.

Precipitated protein particles may be in the form of very finely dispersed matter, fine granules, coarse granules, or flocculent materials. In any case, protein particles form a curd which is soft and will not withstand repeated washing or agitation. This curd, being soft and fragile, becomes finer with each succeeding washing operation and requires longer settling times thereafter, such times varying from twenty minutes to several hours. After decantation of supernatant liquor, the protein material still contains from 90% to 98% moisture in the form of dispersed and free water. It is this moisture with which our invention is concerned.

The protein is then placed in draining or filtering cloths made of heavy duck or the like which may be suspended over drums or hung from suitable means to drain. However, the protein curd, being soft and mushy, fills the pores of the cloths and forms a continuous seal, retarding filtration of the remaining water with the result that many hours are required in obtaining protein cakes dry and hard enough to permit further processing. Even though filtration time is shortened considerably when pressure is applied to the cloths, it may require up to six hours to obtain solid contents of 60% or higher.

This protein cake may then be grated on trays and requires a further six to eight hours at room temperature or at least four hours at 100° to 140° F. under vacuum to complete the drying process. Drying protein has a tendency to surface-dry or case-harden so that the inner portions dry very slowly.

Our method of dehydration includes the step of slow-freezing. It has been found that when such materials are frozen slowly, the dispersed or free water therein forms relatively large crystals of ice. When the materials are then thawed, the protein material will settle out and the water may be removed by simple decantation.

However, when the material is subjected to instantaneous or "sharp" freezing, the large ice crystals do not form; and on thawing out, there is no tendency for the protein and water to separate. Apart from the purely physical aspects of dehydration, the slow-freezing process denatures the protein to some extent in that there is a change in the alignment or linkage of the protein molecules. This denaturation is absent when the protein is treated by conventional methods or by instantaneous freezing.

The material may be frozen by one of several well-known means. Thus, it may be placed in a tank and the tank then placed in a refrigerating medium; or coils in which such a medium circulates may be placed in said tank.

In either of the above methods, the layers of material in immediate contact with containers or coils will freeze substantially instantaneously while the remainder freezes more gradually. This type of freezing is desirable, even though the first layer of ice acts as insulation, for this insulating property causes the inner portions to freeze more slowly.

Freezing proteins instantaneously by spraying in an atmosphere of −20° F. or freezing thin layers ⅛"–¼" in several minutes is not an effective method of dehydration. Experiments conclusively show that the freezing must be gradual. The more gradual the freezing, the larger will be the ice crystal formations and, consequently, greater will be the change in the protein dehydration. When protein is frozen in this manner, the resulting frozen mixture is made up of stratifications of thin layers of protein and thicker layers of ice. It is because of this that effective dehydration results.

Successful partial dehydration and denaturation has been accomplished by freezing such materials for periods ranging from thirty minutes to twelve hours, depending on the quantity or thickness of material between coils and the results desired. Denaturation of the protein can be easily controlled and the resulting product, even when prepared for synthetic soy-protein fiber production, shows very little or no deleterious degradation.

As a specific example of the foregoing process, the following routine will produce protein from soy beans suitable for use in artificial fiber production.

Manchu, Mandarin or Illini soy beans are crushed into thin flakes in a flaking machine. These flakes contain 15 to 20% of soy-bean oil. This oil is extracted by constant agitation of the flakes by means of a ribbon screw conveyor operating in a countercurrent of hexane. The ratio of two parts of hexane to one part of soy flakes by weight is satisfactory. At one end of the extractor, a mixture of hexane, soy-bean oil and fine particles of soy-bean meal, known as miscella, is withdrawn and pumped to a system of heat exchangers and stills. The hexane is separated from the miscella by evaporation, condensed, and then reused in a continuous manner. The remainder of the mixture, consisting of oil and fine meal, is allowed to settle and the clear oil is stored for future use.

The hexane-soaked flakes are continuously delivered from the other end of the extractor to evaporators whose temperatures are maintained as low as possible consistent with obtaining a hexane-free meal. This meal should contain less than 1% oil and its temperature in all steps of the process should be kept at approximately 140° to 150° F. It will contain from 40% to 55% protein.

Protein is extracted from this meal by mixing 13 lbs. of meal with 104 lbs. of water at approximately 115° F., constantly stirring the mixture to keep the meal in suspension and adding diluted NaOH so that the pH rises to 10.3. The mixture is stirred for thirty minutes and an additional 286 lbs. of cold water is added; or, if desired, the total 390 lbs. of water may be added at the initial step. The recoverable protein is now in a light amber solution and the coarse, undissolved particles are separated from it by settling. The supernatant liquor is then clarified in an automatic sludge-unloading centrifuge. A clear effluent of dissolved protein remains.

Protein is precipitated from this effluent at a pH 4.6 by using sulphurous acid. The effluent may be heated before or after precipitation to approximately 140° to 150° F.; this heating materially aids in the settling of the precipitate or curd. About 100 lbs. of curd is obtained which contains approximately 2 to 10 per cent of protein. Greater or lesser protein concentration is determined by the time allowed for settling.

The curd may now be frozen. In this step approximately 400 lbs. of curd is placed in an insulated tank in which are suspended refrigerant coils in which chilled glycol is circulated as a cooling medium. The temperature of the glycol is approximately 0° to 5° F. Sufficient glycol is circulated to freeze the curd solid in about five hours, the freezing point of the curd being approximately 30° F.

The frozen curd is now thawed by recirculating the glycol at a temperature of 140° F. through the coils, care being taken that the curd temperature does not exceed 115° F. The curd is washed and the excess liquid is decanted from the protein which now settles almost immediately. The protein is placed in cloths and pressed for fifteen minutes to remove the remaining free water, resulting in a granular or fibrous mass containing approximately 50% protein.

Unfrozen protein after precipitation, settling and decantation is an easily dispersible product; it has a white to light grey color; it is very soft, mushy and difficult to handle and does not settle, drain or filter satisfactorily; it cannot be centrifuged readily, nor can it be washed without reduction of particle size; and it dries very slowly. Furthermore, it cannot be used in curd form for solutions because of a foaming and whipping tendency; and it does not go into solution readily due to an appreciable tendency to lump.

Protein treated by freezing, however, will have changed its color from white or light grey to a darker grey or light buff, depending on the speed of freezing. The more gradual the freezing, the greater will be the color change and the change of physical characteristics. The latter will vary with the freezing time so that the product may be granular or in the form of tough, fibrous, sponge-like plastic amorphous masses which are formed by the agglomerations of the particles during freezing.

The frozen protein on thawing gives particles that do not break up easily. It settles quickly and compactly so that it may be washed several times without loss of curd. The thawed protein will drain quickly and can be pressed in a fraction of the time that unfrozen protein requires. The product is no longer sticky or gummy and therefore can easily be grated for drying. Since the proteins so treated are porous, the drying time is reduced by more than 50%. The dried product has a lighter color and lacks the luster or glazed surface of dried unfrozen protein. Moreover, the thawed protein does not have to be dried before being put into solution. After the treated protein has been reduced to a desired moisture, solvents may be added without noticeable tendency to foam, whip or lump. If desired, the protein can easily be stored in the wet form for future use and it has less tendency to putrify or degrade than does the unfrozen protein.

The dehydration by freezing is applicable to processing proteins for any purpose and it is particularly valuable, because of the attendant denaturation, to proteins for spinning. Since the object is to obtain proteins that can be readily adapted for spinning a fiber that closely resembles wool, one of the most important steps in manufacturing such proteins is to modify the complex protein molecule so that it resembles the molecules of wool. The globulin proteins, such as that of soy beans, like other proteins, have a very complex and globular configuration, while the structure of wool consists of parallel bundles of long chain molecules. Therefore, protein has to be denatured by a suitable process so that such globular structure or configuration can be altered to conform as closely as possible to the structure that is characteristic of wool without degrading or decomposing such treated proteins.

Treatment such as slow-freezing for denaturing proteins does not tend to degrade or decompose them because the effect of the treatment is not to change the chemical composition but merely to change the chemical linkages.

It has been interpreted by means of X-ray investigation that protein of the globulin classification may undergo several degrees of denaturation. It has also been implied that denaturation entails a breakdown of the globular configuration into the longer polypeptide chains. Such chains may group themselves in parallel bundles somewhat similar to those found in beta keratin (stretched wool fiber). If the denaturation of protein can be fully accomplished without degradation, the resulting protein will be a fibrous-like material that closely resembles beta keratin.

In our experience with frozen proteins for synthetic fiber production, we have found that they can be employed wherever other proteins have previously been employed. The solubilities, viscosities and spinnabilities of the proteins, frozen and unfrozen, are related; but they are greatly in favor in the frozen protein. It has been found that frozen protein will yield a greater useable solid content in dispersion or solutions for a given viscosity, which results in better fibers from the standpoint of spinning and strength. Thus, we use a conventional .004 inch, 500 hole spinnerette and the following precipitating bath:

|  | Percent by weight |
|---|---|
| $Al_2(SO_4)_3$ | 18 |
| $NaCl$ | 12 |
| $H_2SO_4$ | 2 |
| $H_2O$ | 68 |

Another use is in the better grades of cold-water paints in which frozen protein forms excellent and stable emulsions with drying or semi-drying oils. These paints have long shelf life because the emulsions are stable, form on thinning an enamel-like paint that dries with a slight sheen, and have resultant films which under severe test conditions do not check, blister or chalk as readily as do other similar paints.

The two preceding specific examples exemplify the versatility of use of this protein; there are others in the paper, plastic, glue and like industries.

Further, present commercial proteins, when suspended in water, have a pH as low as 4.2, while proteins prepared as described herein contain less free acid and salt and have a pH in excess of 5.5. As a result, less solvent is required to dissolve the protein and the solution will contain less salts formed by reaction of the solvent and free acid.

Finally, this process may be carried out in a continuous manner as well as by batch method, while former processes were limited to batch methods alone.

Some changes or modifications may be made in the methods or steps thereof comprising our invention without departing from the spirit of our invention, and it is our intention to cover by our claim such changes as may reasonably be included within the scope thereof.

We claim:

The method of changing the physical characteristics of soybean protein, comprising, the steps of extracting the protein by means of an aqueous alkaline solution at about a pH of 10.3, precipitating the protein from said solution with a mineral acid at the isoelectric point of said protein, decanting the supernatant liquor from said precipitate whereby a protein material containing about 90% moisture remains, slowly chilling said protein over a period of five hours to reduce the temperature thereof to the freezing point and to freeze said protein material, thawing said frozen protein, said protein being denatured by said freezing.

ROBERT A. BOYER.
WILLIAM T. ATKINSON.
JOSEPH CRUPI.